United States Patent [19]
Meunier

[11] Patent Number: 4,573,357
[45] Date of Patent: Mar. 4, 1986

[54] ELASTIC SURFACE WAVE FORCE SENSOR

[75] Inventor: Paul L. Meunier, Paris, France

[73] Assignee: Thomson-CSF, Paris, France

[21] Appl. No.: 610,859

[22] Filed: May 16, 1984

[30] Foreign Application Priority Data

May 20, 1983 [FR] France .................. 83 08428

[51] Int. Cl.⁴ ............................................. G01P 15/08
[52] U.S. Cl. ............................. 73/517 R; 73/DIG. 4;
310/331; 310/338
[58] Field of Search .............. 73/517 R, 703, DIG. 4;
310/330, 331, 339, 313 B, 368

[56] References Cited

U.S. PATENT DOCUMENTS

| | | | |
|---|---|---|---|
| 3,479,536 | 11/1969 | Norris | 310/323 |
| 3,878,477 | 5/1975 | Dias et al. | 73/DIG. 4 |
| 4,107,626 | 8/1978 | Kiewit | 73/DIG. 4 |
| 4,306,456 | 12/1981 | Maerfeld | 73/DIG. 4 |
| 4,333,342 | 6/1982 | Gilden et al. | 73/516 R |
| 4,515,016 | 5/1985 | Hartemann et al. | 73/517 R |

FOREIGN PATENT DOCUMENTS

| | | |
|---|---|---|
| 17554 | 10/1980 | European Pat. Off. . |
| 2757577 | 6/1979 | Fed. Rep. of Germany . |
| 2273259 | 12/1975 | France . |

Primary Examiner—Anthony V. Ciarlante
Attorney, Agent, or Firm—Roland Plottel

[57] ABSTRACT

The invention provides a sensor comprising a plate resting on two supports by simply bearing thereon, for creating in said plate uniform bending stresses in a defined zone of said plate. Detector means for detecting the stresses undergone by said plate may be placed in said zone without their location being defined with precision.

14 Claims, 11 Drawing Figures

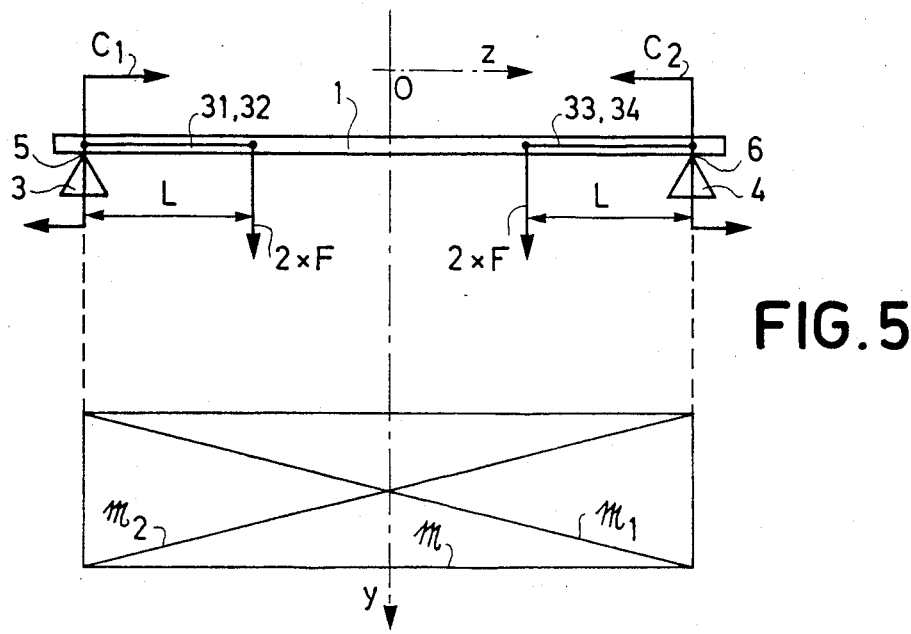
FIG.5
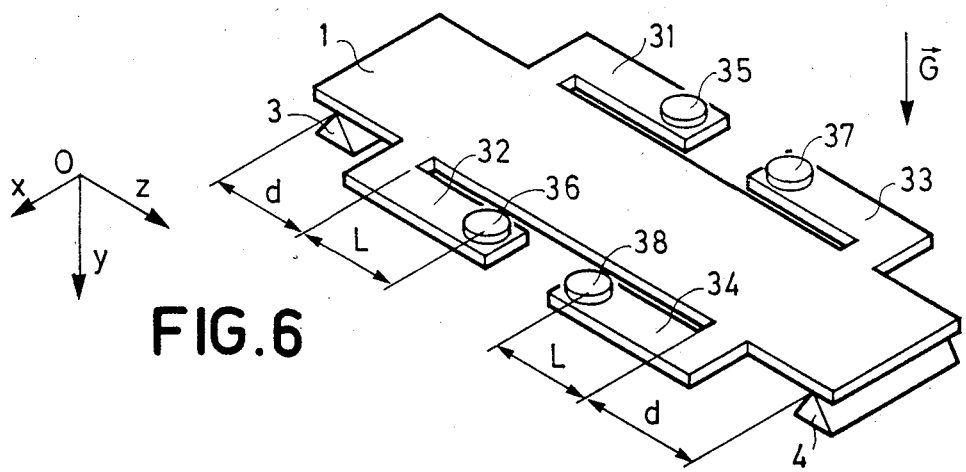
FIG.6
FIG.7
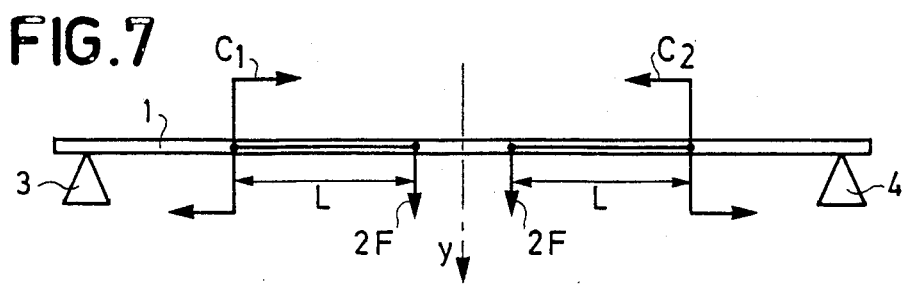

ELASTIC SURFACE WAVE FORCE SENSOR

BACKGROUND OF THE INVENTION

1. Field of the Invention

The present invention relates to elastic surface wave force sensors and more particularly to those comprising at least two oscillators connected to transducer means situated on both faces of a resilient plate bending under the action of the acceleration. It may more particularly be used in accelerometers and in this case their structure allows the acceleration to be measured along a component of direction normal to the main faces of the plate.

2. Description of the Prior Art

Such a plate generally comprises at least one end embedded in a frame and a mass acting on the plate in said direction. The transducer means are designed for exciting and collecting elastic surface waves whose propagation speed is known to vary as a function of the mechanical bending stresses. In a first embodiment, the transducer means form a transmission line whose delay time determines the phase shift of an oscillating loop. In a second embodiment, the transducer means are situated in a resonating network cavity and are connected to means maintaining the oscillation of the cavity. The frequency representative of the acceleration to be measured results from the subtraction of two oscillation frequencies which have thermal drifts which do not exactly counterbalance each other.

In the design of such devices, it is necessary to provide plates having a geometry such that they provide zones of equal resistance corresponding to the measurement zones so that, during deformation of the plate, the stresses in these zones are uniform and cause a uniform speed of propagation of the elastic surface waves. Moreover, these devices may be designed so as to overcome the thermal drifts created by the stresses at the embedment points of the plate.

SUMMARY OF THE INVENTION

To get over these difficulties, the invention provides a sensor in which the plate has a generally rectangular shape and so does not have a geometrical shape which is difficult to obtain. Furthermore, the plate does not have any embedment point which overcomes the associated heat problems.

The invention provides then an elastic surface wave force sensor comprising a plate having parallel first and second faces, pressure means applying bending forces to be measured on the first face of the plate, elastic surface wave oscillator measuring means disposed on said parallel faces and detecting the bending stresses created in the parallel faces by the forces to be measured, wherein said plate bears through its second face on simple bearing supports, said pressure means being situated between the two supports so as to define an iso-stress zone in which oscillator means are placed.

BRIEF DESCRIPTION OF THE DRAWINGS

The invention will be better understood from the following description and the accompanying Figures in which:

FIG. 5 is a Figure for explaining the device of FIG. 4;

FIG. 6 shows an isometric view of a variant of the force sensor of the invention using force couples;

FIG. 7 is a Figure for explaining the device of FIG. 6;

DESCRIPTION OF THE PREFERRED EMBODIMENTS

In the following description, the mechanical bending stresses are generated by forces appearing on the main faces of a plate of constant thickness cut from a material capable of propagating elastic surface waves. In the case of an accelerometer, these forces are forces due to the acceleration. Accelerometers will be described in which this acceleration is exerted on masses placed on one of the main faces of the plate. Furthermore, by way of non limitative example, a plate may be used cut from a crystalline piezoelectric material such as quartz, but with a more complex construction of the elastic surface wave transducer means, a silica plate could also be used. In so far as measurement of the acceleration is concerned, it is the component along the normal to the main faces of the plate which is measured. The cuts envisaged are such that rigidity to bending for forces parallel to the main faces of the plate is greater than the rigidity required for measuring the normal component of the acceleration. The accelerometer necessarily comprises a plate support allowing bending thereof.

Figure 1:
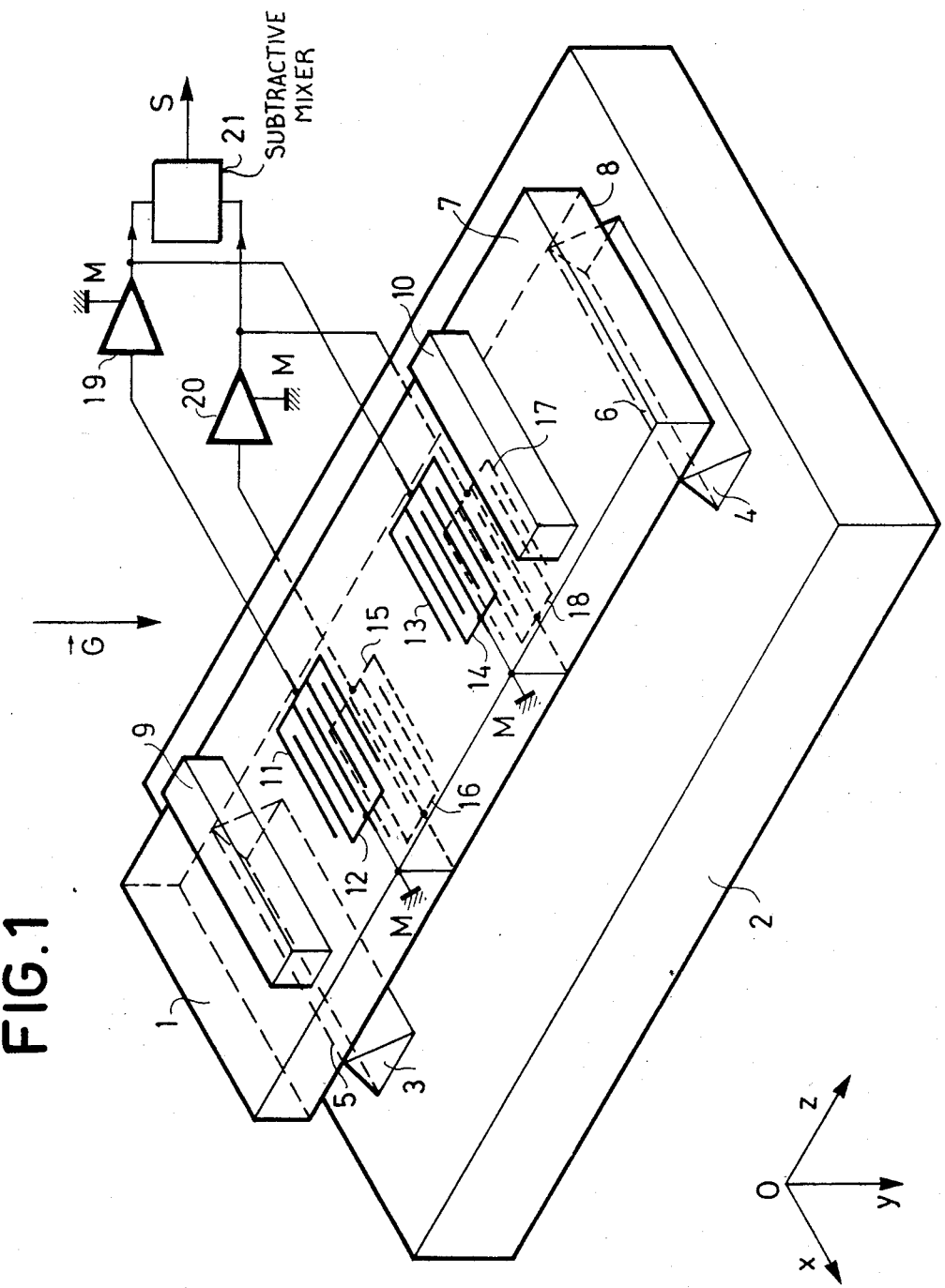
FIG. 1 shows an isometric view of one embodiment of the force sensor of the invention.

In FIG. 1 is shown an accelerometer in accordance with the invention related to a tri-rectangular trihedron Oxyz.

This accelerometer comprises a plate 1, having the form of a rectangular parallelepiped, resting on the sharp edges 5 and 6 of simple pivots 3 and 4 belonging to a support frame 2. If we consider the plane of symmetry xOy of the device such that the sharp edges 5 and 6 are symmetrical and parallel to this plane, two masses 9 and 10 symmetrical with respect to this plane are placed on the upper face 7 of plate 1. On face 7 are provided interdigitaed electrodes 11–12 and 13–14 symmetrical with respect to the plane xOy. The same goes for the opposite face 8 with electrodes 15–16 and 17–18 which are staggered slightly so as to limit the parasite couplings due to the magnetostatic volume waves. These electrodes define radiating gaps. Electrodes 11 and 12 form a transducer for emitting elastic surface waves which progress in the direction Oz before being picked up by electrodes 13 and 14 forming the reception transducer. Electrodes 12 and 14 are connected to an electric ground M. Electrodes 11 and 13 are connected respectively to the input and to the output of an amplifier 19. The assembly of the conducting elements born by face 7 forms then an elastic surface wave delay line which plays the role of a loop for amplifier 19. Similarly, electrodes 15, 16, 17, 18 borne by face 8 form an elastic surface wave delay line relooping the input and the output of another amplifier 20. We have then a pair of oscillators whose oscillation frequencies f1 and f2 are related to the transit times t1 and t2 of the elastic surface waves exchanged along faces 7 and 8. The outputs of amplifiers 19 and 20 are connected to the inputs of a subtractive mixer 21 whose output S supplies an alternating signal of frequency $f=f1-f2$. So as not to overload the drawings, ground connections M have been added to the electric diagram of FIG. 1.

Under the effect of an acceleration $\vec{G}$ directed along the axis Oy in the direction $\vec{Oy}$, masses 9 and 10 each exert a force $\vec{F1}$, $\vec{F2}$ on plate 1 which bends. The bending of plate 1 causes mechanical stresses to appear in opposite directions at the level of faces 7 and 8, which results in modifying in opposite directions the propagation times t1 and t2 of the elastic surface waves. The result is new oscillation frequencies f1+df and f2−df and a signal at output S having a frequency f+2df. The acceleration $\vec{G}$ is therefore measured by a frequency variation 2df.

Figure 2:
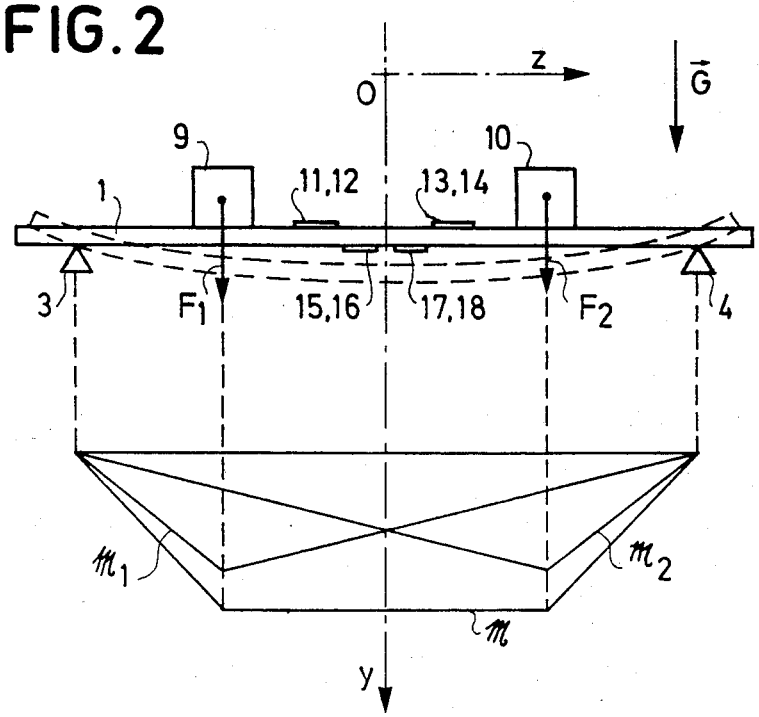
FIG. 2 is a Figure for explaining the device of FIG. 1.

FIG. 2 shows a simplified view of the sensor of FIG. 1. We find again in this Figure plate 1, supports 3 and 4, masses 9 and 10 and transducers 11-12 to 17-18.

Under the effect of an acceleration $\vec{G}$ directed along axis Oy and in the direction $\vec{Oy}$, and of masses 9 and 10, plate 1 bends and assumes a position such as shown with broken lines.

Masses 9 and 10 have the same value and the forces $\vec{F1}$ and $\vec{F2}$ which they exert because of the acceleration G are equal. The center of gravity as well as supports 3 and 4 are situated symmetrically with respect to axis Oy. We have then a symmetry of the system with respect to axis Oy.

In the lower part of FIG. 2, the diagrams of the moments have been shown. Curve M1 shows the curve of the bending moments due to force $\vec{F1}$. Curve M2 shows the curve of the bending moments due to force $\vec{F2}$. These curves are symmetrical with respect to axis Oy and are each formed by two half lines. The resulting curve M has then a symmetry with respect to axis Oy and comprises in its central part, situated between the points of application of forces $\vec{F1}$ and $\vec{F2}$, corresponding to the center of gravity of masses 9 and 10, a rectilinear part parallel to axis Oz. In this rectilinear part, the plate undergoes then uniform stresses, transducers 11-12 to 17-18 may therefore be placed anywhere on faces 7 and 8 within the limits of this rectilinear part.

In the foregoing, the proper mass of the plate has been neglected. In fact, the plate will be formed so that its mass is negligeable with respect to masses 9 and 10, and its elastic properties are used.

Finally, deformation of plate 1 by simple bending also produces mechanical shearing stresses, but they are zero along the free faces 7 and 8 which convey the elastic surface waves. This is why simple bending may be likened to pure bending. So as to avoid the appearance of out of true bending, plate 1 and masses 9 and 10 have a form with a plane of symmetry parallel to yOz, thus avoiding the mechanical twisting stresses of plate 1.

Figure 3:
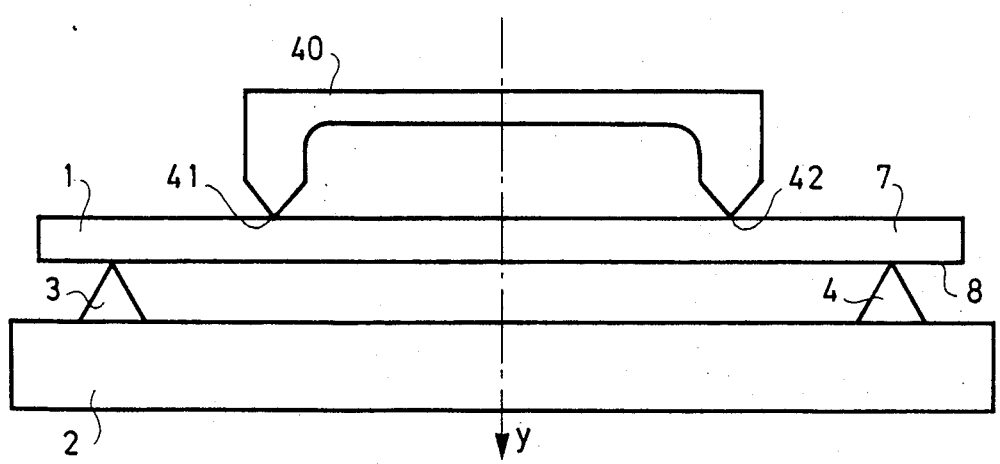
FIG. 3 shows a variant of the force sensor of FIG. 1.

For the ease of manufacture of the force sensor, masses 9 and 10 exerting a force on plate 1 may be formed as a single part. Thus, in FIG. 3, a mass 40 has been provided resting by its ends 41 and 42 on the face 7 of plate 1. So as to allow bending deformation of plate 1, mass 40 is not integrally connected to plate 1 and allows possible sliding between ends 41 and 42 and face 7. For this, the contact surfaces between ends 41, 42 and face 7 are reduced.

Figure 4:
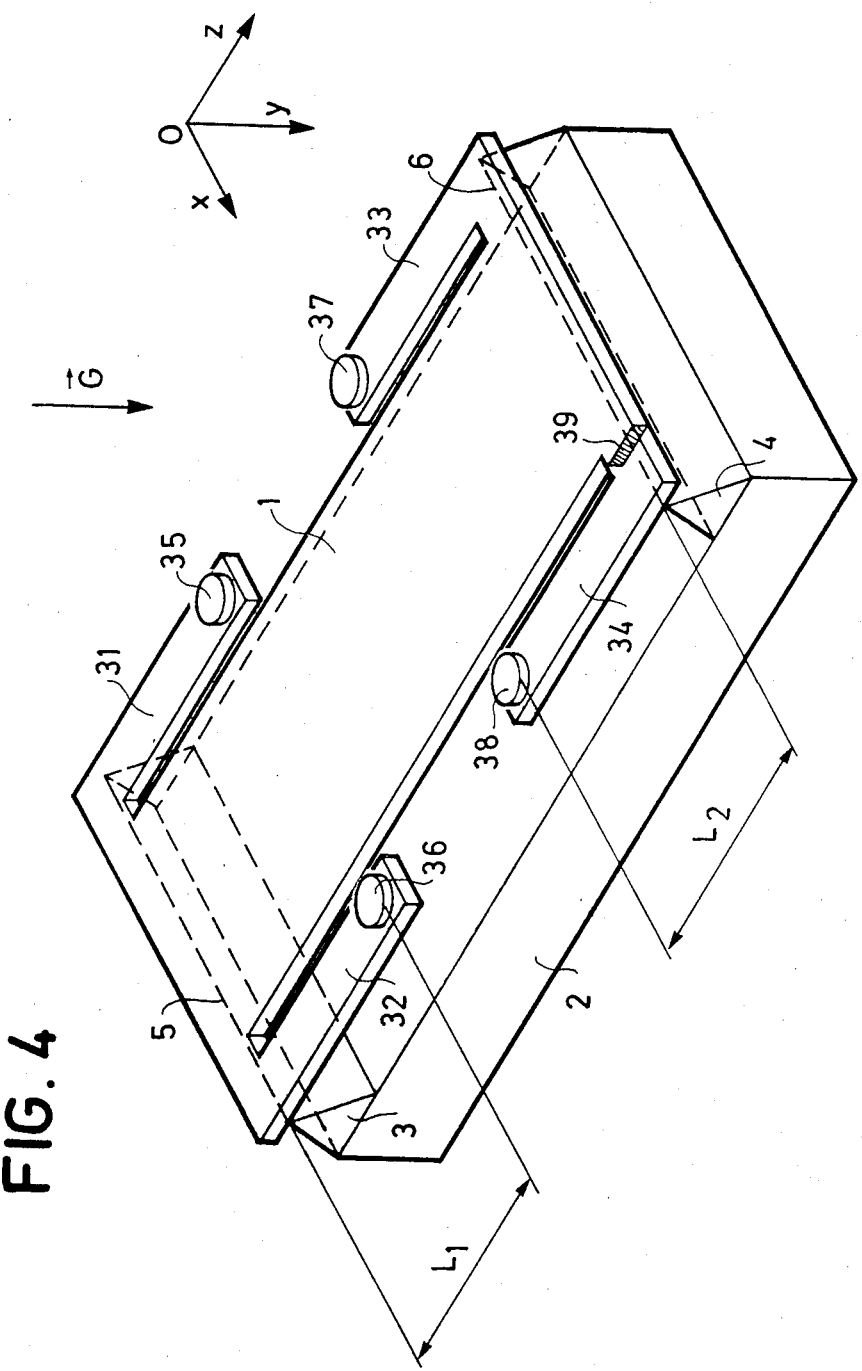
FIG. 4 shows an isometric view of one embodiment of the force sensor of the invention using force couples.

Referring to FIGS. 4 and 5, another embodiment of the force sensor of the invention will now be described.

In this Figure, we find again the frame 2, supports 3 and 4 and plate 1.

To simplify the Figure, transducers 11 to 18 have not been shown nor the circuits 19, 20, 21. But it is obvious that they would be required for operation of the sensor as was described in connection with FIG. 1.

The plate has identical tongues 31, 32, 33, 34 disposed in pairs on each side of the plate. The plate rests on the sharp edges 5 and 6 of supports 3 and 4. Tongues 31 and 32 are connected on each side of plate 1, at the level of sharp edge 5. Tongues 33 and 34 are connected on each side of plate 1, at the level of edge 6. The ends of the tongues are provided with masses 35, 36, 37, 38 of the same value.

Under the effect of an acceleration $\vec{G}$ along axis $\vec{Oy}$, the different masses 35 to 38 exert forces in a direction opposite the direction of the acceleration, of the same value f, at the end of the tongues. These forces tend to cause the tongues to rotate with respect to plate 1. Thus tongue 34, for example, rotates with respect to the connection section 39 at plate 1. In fact, by defining in section 39 a sector of rotation of tongue 34 and causing this center to coincide with a plane parallel to xOy and containing edge 6 of support 4, it may be considered that tongue 34 rotates substantially about edge 6. The same goes for tongue 33 as well as for tongues 31 and 32 relatively to edge 5. Moreover, the connections of the tongues to the plates are rigid, rotation of the tongues results then in causing plate 1 to bend.

FIG. 5 explains the action of the forces exerted at the ends of the tongues. We find again in this Figure plate 1 resting on edges 5 and 6 of supports 3 and 4, and tongues 31-32 and 33-34. At the end of each tongue is exerted a force $\vec{F}$, corresponding to masses 35 to 38, at a distance L from edges 5 and 6. Each force $\vec{F}$ gives rise to a twisting torque whose axis coincides substantially with an edge of a support. Since tongues 31-32 are shown as a whole, the equivalent force of the corresponding masses is 2F and the equivalent twisting torque has a value of $C_1=2F.L$. The same goes for tongues 33 and 34 which supply a torque $C_2=2F.L$. Because of the symmetry of the system with respect to axis Oy, torques $C_1$ and $C_2$ have the same value and the same action on plate 1. The curves of moments shown in the lower part of FIG. 5 provide, for torque $C_1$, a straight line M1 and for torque $C_2$ a straight line M2, which are symmetric with respect to axis Oy. The resulting curve is a straight line M parallel to the axis Oz. Which shows that plate 1 is iso-stressed between supports 3 and 4.

FIG. 6 shows a variant of the sensor of FIG. 4. In this variant, the points of connection of tongues 31 to 34 are situated between the supports. The pair of tongues 31-32 has its connection points on an axis parallel to support 3 and situated at a distance d from this support. The same goes for tongues 33-34 with respect to support 4.

The system is then symmetrical with respect to axis Oy as appears from FIG. 7.

An acceleration $\vec{G}$ directed along axis Oy gives rise to the application of forces F, due to masses 35 to 38, at the end of tongues 31 to 34. As in the sensor of FIGS. 4 and 5, these forces result in bending torques $C_1$ and $C_2$ equal and symmetric with respect to axis Oy, tending to cause plate 1 to bend. Furthermore, in the present case, the axes of these torques $C_1$ and $C_2$ are not situated along the edges of the supports 3 and 4 but are distinctly located between supports 3 and 4. The iso-stressed zone of plate 1 is that between the axes of torques $C_1$ and $C_2$. The detection transducers described in connection with FIG. 1 will be placed in this iso-stressed zone.

It should be noted that in the sensors described with respect to FIGS. 3 to 6, only the incidence of the force couples due to masses 35 to 38 at the end of the tongues have been considered and the weight of the tongues and of the masses themselves has been neglected.

Figure 8:
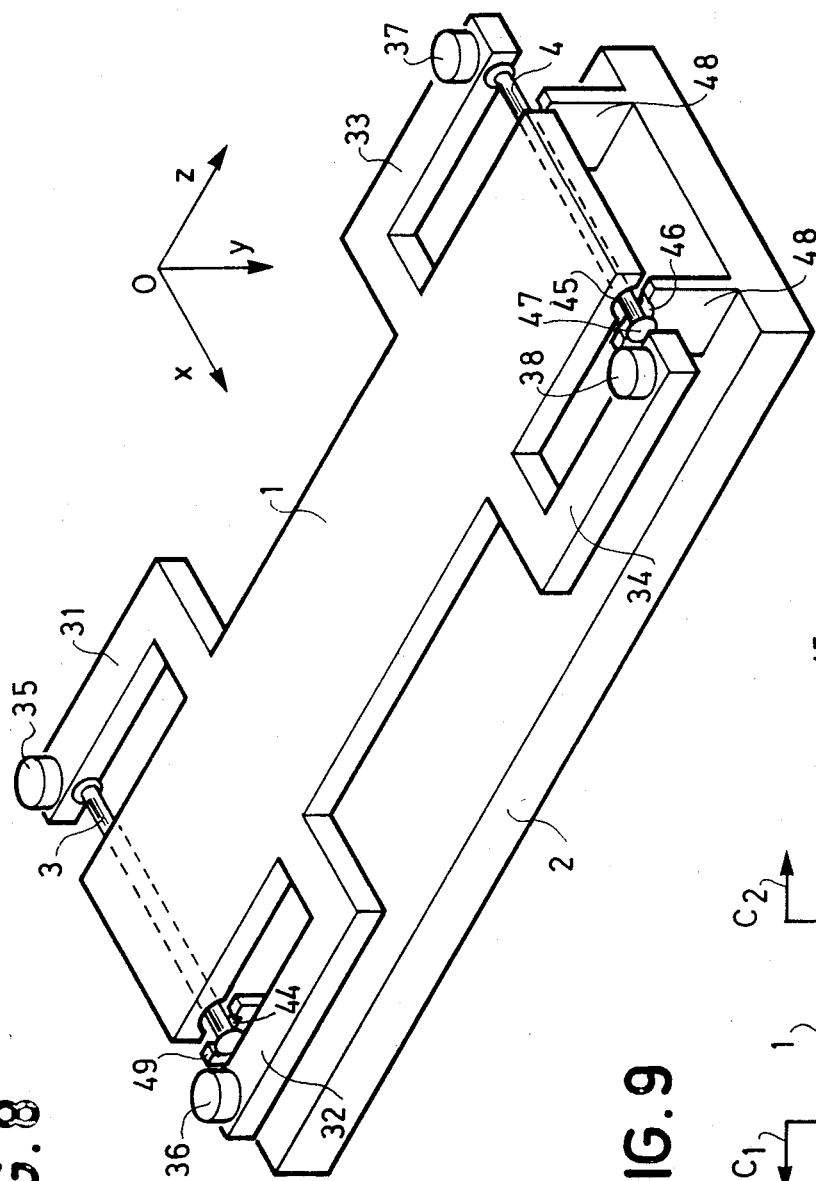
FIG. 8 shows an isometric view of another variant of the force sensor of the invention.
Figure 9:
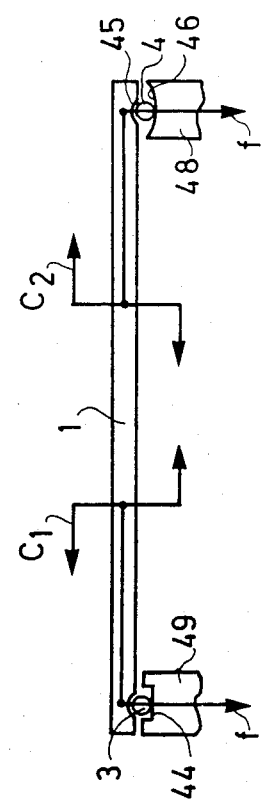
FIG. 9 is a Figure for explaining the device of FIG. 8.

Referring to FIGS. 8 and 9, a preferred embodiment of the force sensor of the invention will now be described.

This sensor differs from that shown in FIGS. 6 and 7 by the orientation of tongues 31 to 34 and by the nature of the supports.

In fact, supports 31 to 34 are, in FIGS. 8 and 9, connected to plate 1 at a point situated between the supports of the plate. Furthermore, they are orientated towards the supports. The center of gravity of each mass 35 to 38 is in a plane xOy containing the axis of a support of plate 1. Thus, the incidence of the weight of the masses f on the behavior of the plate is cancelled out by the presence of the supports. The weight of the tongues is negligeable. Only the force couples $C_1$ and $C_2$ due to masses 35 and 38 during an acceleration have a substantial incidence.

In so far as the supports are concerned, they are formed from cylindrical surfaces allowing better movement of the plate with respect to the supports during bending. At each end of the plate along axis Oz has been formed a cylindrical groove such as 45 parallel to the axis Ox and receiving shafts 3 and 4. Frame 2 comprises bases such as 48 and 49 having sliding surfaces on which shafts 3 and 4 rest. At one of the ends of plate 1, the bases, such as 48, have a cylindrical surface, such as 46, receiving shaft 4. At the other end of plate 1, the bases such as 49 have a flat surface 44 receiving shaft 3.

Plate 1 rests on the sliding surfaces through shafts 3 and 4 and is therefore not rigidly connected to frame 2. At each end of shafts 3 and 4, a cheek such as 47 prevents lateral movement of the shaft. Moreover, the situation of the shafts in the cylindrical grooves prevents them from moving along plate 1.

In such an arrangement, a plate 1 having a thickness of 0.8 mm, a length of 40 mm and a width of 4 mm will be chosen. The length L of the tongues is 10 mm, which provides an iso-stressed zone of 20 mm for placing the detectors. Finally, the value of each mass is 10 g.

So as to reduce the thermal problems, the shafts are made from quartz or silica.

Figures 10, 11:
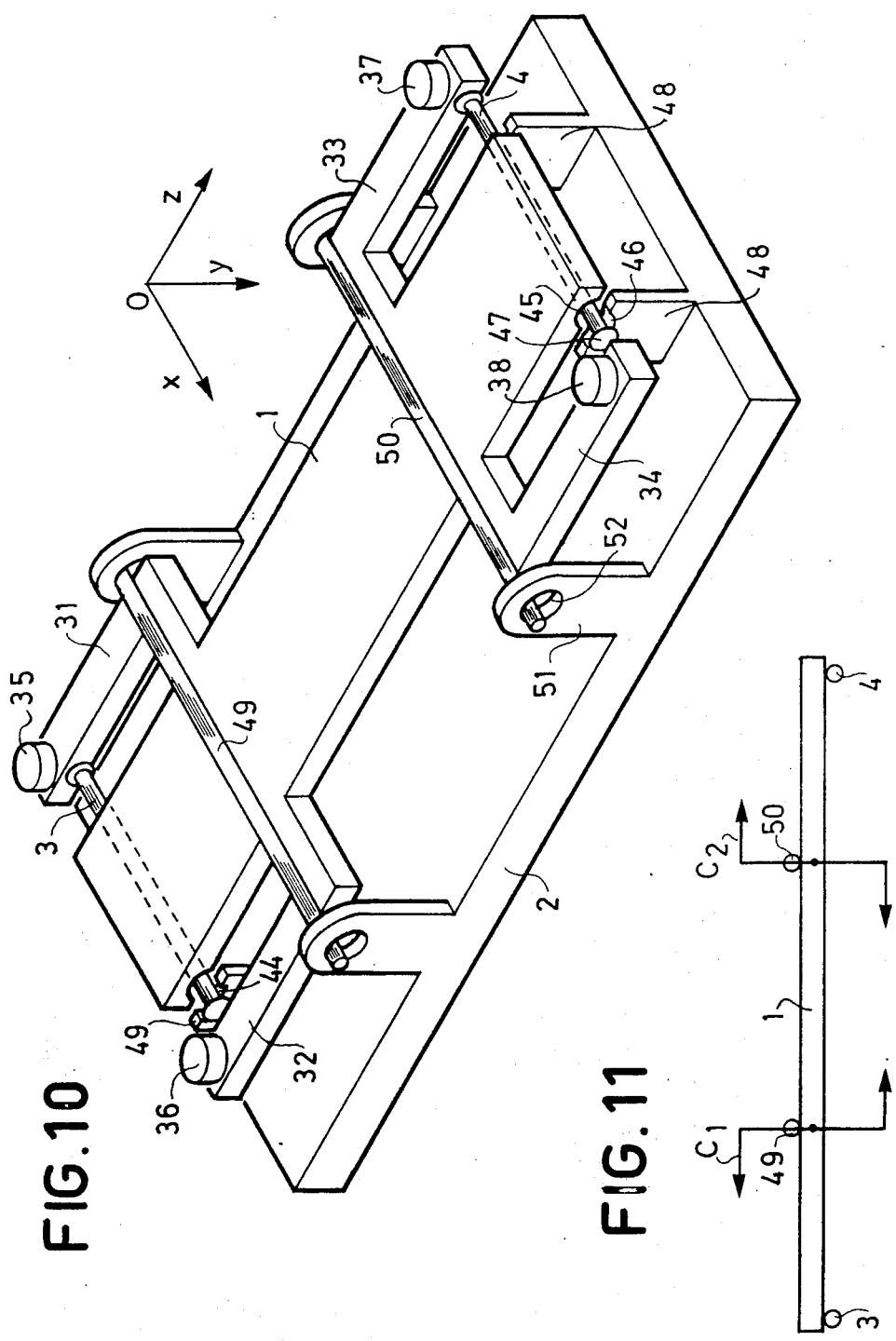
FIG. 10 shows an isometric view of one embodiment of the force sensor of the invention in hyperstatic equilibrium.
FIG. 11 is a Figure for explaining the device of FIG. 10.

The systems described above with reference to FIGS. 1 to 9 are systems in iso-static equilibrium. The system of FIGS. 10 and 11 is a hyperstatic system. It differs from the sensor of FIG. 9 by the addition of shafts 49 and 50 situated on the upper surface of plate 1 along the axis of the torques exerted by masses 35, 36 on the one hand and 37, 38 on the other, under the effect of the acceleration G. These shafts are housed on each side of plate 1 in cylindrical openings such as 52 formed in projections 51. The upper part of opening 52 is situated so that, in the rest position of plate 1, shaft 50, resting on the plate, is flush with this upper part.

Thus, with reference to FIG. 11, it can be seen that a bending torque created as previously described, results in urging plate 1 against shafts 49 and 50. Between the axes of the bending torques, that is to say between shafts 49 and 50, an iso-stress zone is always obtained. On the other hand, the plate zones between shafts 3 and 49 and between shafts 4 and 50 provide stiffening of the plate. Thus, a reduction in the sensitivity and an increase in the resonance frequency are obtained. Moreover, zones 3–49 and 4–50 play the role of return spring for plate 1.

What is claimed is:

1. An elastic surface wave force sensor comprising a plate having first and second parallel faces, means for applying bending forces to be measured to the first face of the plate, elastic surface wave oscillator measuring means disposed on said parallel faces and detecting bending stresses created in the parallel faces by the forces to be measured, said plate resting its second face on two simple pivot bearing supports, said applying means being situated between said two supports so as to define an iso-stress zone in which said oscillator means are placed, and said supports providing uniform stress to said plate between said two supports when a force is applied.

2. The elastic surface wave force sensor as claimed in claim 1, wherein said plate has one of its main faces disposed along a reference plane; said plate having parallel faces; said two supports being rectilinear, parallel and equidistant from a reference axis of the plate; and applying means being formed by two equal masses disposed on said plate; and said bending forces being generated by an acceleration directed along the axis perpendicular to said reference plane, in the same direction and with the same value at points equidistant from said reference axis.

3. The elastic surface wave force sensor as claimed in claim 2, wherein said two masses are situated between two supports.

4. The elastic surface wave force sensor as claimed in claim 1, wherein said plate has one of its main faces disposed in a reference plane, said plate being isotropic and having parallel faces; said two supports being rectilinear, parallel and equidistant from a reference axis of the plate said sensor further comprising a single mass resting on two symmetrical points with respect to said reference axis, the center of gravity of said mass being situated in a plane containing said axis and parallel to the direction of the forces exerted by said mass on said plate.

5. The elastic surface wave sensor as claimed in claim 1, wherein the forces exerted on said plate are formed by two couples each having their axis disposed parallel to said supports of said plate and acting thereon with reverse directions of rotation.

6. The elastic surface wave force sensor as claimed in claim 5, wherein said plate is isotropic and has parallel faces; said two supports are rectilinear, parallel and equidistant from a reference axis of said plate; and said two force couples are equal and have their axes parallel and equidistant from said reference axis.

7. The elastic surface wave force sensor as claimed in claim 6, wherein said plate comprises two pairs of tongues disposed symmetrically with respect to said reference axis, the two tongues of each pair being connected on each side of said plate and disposed in a plane parallel to said reference plane and orthogonally to the direction of said support; forces being exerted at the free end of each tongue.

8. The elastic surface wave force sensor as claimed in claim 7, wherein the two pairs of tongues are connected to said plate each at the level of a support.

9. The elastic surface wave force sensor as claimed in claim 7, wherein each tongue comprises a mass at its free end.

10. The elastic surface wave force sensor as claimed in claim 7, wherein the points of connection of said tongues to said plate are situated between said supports.

11. The elastic surface wave force sensor as claimed in claim 10, wherein the tongues of each pair are orientated from the connection points towards a support so that the resultant of the weights of the masses of a pair of tongues is in the same plane as the corresponding support.

12. The elastic surface wave force sensor as claimed in claim 7, wherein the tongues of the first pair of tongues are connected to said plate at points situated along a third support; the tongues of the second pair of tongues are connected to said plate at points situated along a fourth support; the third and fourth supports being situated between the first and second supports.

13. The elastic surface wave force sensor as claimed in claim 12, wherein the first and second supports are disposed along a face of said plate; the third and fourth supports are disposed along the opposite face of said plate so that they oppose the force couples applied by said tongues.

14. The elastic surface wave force sensor as claimed in claim 13, wherein the third and fourth supports are situated symmetrically with respect to said reference axis.

* * * * *